United States Patent [19]
Bednarz et al.

[11] Patent Number: 5,601,853
[45] Date of Patent: Feb. 11, 1997

[54] ELECTRICALLY CONDUCTIVE CERAMICS AND THEIR USE IN FIBER CHARGING APPARATUS

[75] Inventors: Thomas K. Bednarz, Richmond, Va.; Kurt R. Mikeska, Wilmington, Del.

[73] Assignee: E. I. Du Pont de Nemours and Company, Wilmington, Del.

[21] Appl. No.: 400,224

[22] Filed: Mar. 7, 1995

Related U.S. Application Data

[62] Division of Ser. No. 282,939, Jul. 29, 1994.

[51] Int. Cl.$^6$ .................................................. B29C 35/10
[52] U.S. Cl. ................... 425/174.8 E; 252/521; 264/484; 361/225; 361/233; 501/117; 501/119
[58] Field of Search ............. 425/174.8 E, 174.8 R; 252/521; 501/117, 119, 120; 361/225, 233; 264/484, DIG. 8

[56] References Cited

U.S. PATENT DOCUMENTS

| | | | |
|---|---|---|---|
| 3,227,784 | 1/1966 | Blades et al. | 264/53 |
| 3,387,326 | 6/1968 | Hollberg et al. | 425/72.2 |
| 3,456,156 | 7/1969 | Kilby et al. | 425/174.8 E X |
| 3,535,588 | 10/1970 | Crook, III | 361/229 |
| 3,565,979 | 2/1971 | Palmer | 264/484 X |
| 3,578,739 | 5/1971 | George | 425/72.2 |
| 3,854,965 | 12/1974 | Niwa et al. | 501/153 |
| 3,860,369 | 1/1975 | Brethauer et al. | 425/3 |
| 4,008,092 | 2/1977 | Mortl | 501/117 |
| 4,045,412 | 8/1977 | Yamada et al. | 264/63 |
| 4,077,808 | 3/1978 | Church et al. | 51/295 X |
| 4,148,595 | 4/1979 | Bednarz | 425/174.8 E X |
| 4,240,891 | 12/1980 | Bannister | 501/120 X |
| 4,316,936 | 2/1982 | Hing | 501/120 X |
| 4,354,964 | 10/1982 | Hing et al. | 252/521 |
| 4,537,733 | 8/1985 | Farago | 425/174.8 E X |
| 4,666,395 | 5/1987 | Shah | 425/174.8 E X |
| 4,696,873 | 9/1987 | Yagasaki et al. | 252/521 X |
| 4,968,238 | 11/1990 | Satterfield et al. | 425/174.8 E X |
| 5,051,586 | 9/1991 | Sabreen | 361/233 X |
| 5,108,658 | 4/1992 | Satek et al. | 252/518 |
| 5,221,558 | 6/1993 | Sonuparlak et al. | 501/120 X |
| 5,250,958 | 10/1993 | Yoshida et al. | 252/521 X |
| 5,296,172 | 3/1994 | Davis et al. | 425/174.8 E X |
| 5,302,564 | 4/1994 | Winkler et al. | 501/117 X |
| 5,346,870 | 9/1994 | Noguchi et al. | 501/119 X |
| 5,401,446 | 3/1995 | Tsai et al. | 361/233 X |

FOREIGN PATENT DOCUMENTS

| | | |
|---|---|---|
| 04972241A1 | 8/1992 | European Pat. Off. . |
| 59-097572 | 6/1984 | Japan . |

OTHER PUBLICATIONS

Garapon, C. et al, "Absorption and fluorescence properties of chromium(3+)-doped nonstoichiometric green spinel", *J. Chem. Phys.*, 95(8), 5501–5512 (1991) (Abstract only).

Blanc, M. et al, "Observation of a complex grain growth mechanism in a sintered alumina", *Mater. Sci. Res.*, 13 (Sintering Processes), 437–438 (1980) (Abstract only).

Kramarz, W. et al, "Electric Conductivity of Chromium Oxides and Cr—Al Catalysts", *Polish Journal of Chemistry*, 53(10), 2075–2078 (Oct. 1980).

Brown, M. A., "The stabilisation of $Cr^{5+}$ in $Al_2O_3$", *J. Phys. C: Solid State Phys.*, 10, 4939–4943 (1977).

Brown, M. A., "The properties of the ion $Cr^{5+}$ in $Al_2O_3$", *J. Phys. C: Solid State Phys.*, 9, 1955–1964 (1976).

(List continued on next page.)

*Primary Examiner*—Richard L. Chiesa

[57] ABSTRACT

A conductive ceramic composition is disclosed which consists essentially of alumina, chromia, and magnesia, and is suitable for use as target electrodes in electrostatic fiber charging applications. Ceramics are disclosed which have exhibit volume resistivities of $10^{12}$ ohm-cm or less at 20° C., and have excellent electrical stability and superior mechanical properties; and an electrostatic charging apparatus is disclosed which employs a ceramic electronic conductor having a volume resistivity of from about $1\times10^7$ to $5\times10^{10}$ ohm-cm and a hardness of at least 5 GPa.

3 Claims, 4 Drawing Sheets

OTHER PUBLICATIONS

Shakhtin, D. M. et al, "High–temperature electrical conductivity of aluminum oxide base ceramics", *Sb. Nauch. Tr., Ukr. Nauch.–Issled. Inst. Ogneuporov*, 13, 275–279 (1970).

Kingery, W. D., *J. Am. Chem. Soc.*, 57, 1–8 (1974).

Kingery, W. D., *Ad. in Ceramics*, 1, (L. M. Levinson, Ed.), American Ceramic Society, Columbus, OH, pp. 1–22 (1981).

Kroger, F. A., *Ad. in Ceramics*, 10 (W. K. Kingery, Ed.), American Ceramics Society, Columbus, OH, pp. 1–15 (1984).

Hamano, K. et al, "Prep. of Porous Spinel Ceramics and Their Electrical Properties", Report of the Research Laboratory of Engineering materials, Tokyo Institute of Technology, No. 10 (1985).

Hashimoto, K. et al, *Japan. J. Appl. Phys.*, 17(12), 2151–2152 (1978).

Roy, S. K. et al, *J. of the American Ceramic Society*, 51(1), 1–6, (1968).

Bennison, S. J. et al, *Ceramic Transactions*, 7, 13–49, (1990).

Kroger, F. A, "Electrical Properties of $\alpha$–$Al_2O_3$", *Advances in Ceramics.* 10, 1–15 (1984).

ELECTRICALLY CONDUCTIVE CERAMICS AND THEIR USE IN FIBER CHARGING APPARATUS

This is a division of application Ser. No. 08/282,939, filed Jul. 29, 1994.

FIELD OF THE INVENTION

This invention relates to electrically conductive compositions and their use, and more particularly to electrically conductive ceramic compositions and their use.

BACKGROUND

Compositions having selective electrical conductivity have been developed for various purposes. For example, U.S. Pat. No. 3,578,739 discloses that a composition having a resistance measured at 65° C. at between $1 \times 10^6$ and $1 \times 10^{10}$ ohms is useful for a covered surface of a target electrode employed in an apparatus for electrostatically charging a continuous fibrous material (e.g., polyethylene) being forwarded in a linear path. Certain carbon-filled polymeric covering compositions for a metal electrode base are disclosed as suitable.

The electrostatic charging of flash-spun polyethylene may be accomplished by corona charging. Target electrodes used in these processes should have the ability to withstand corona potentials used in the charging process, should be suitably resistive to collect the corona current while inhibiting back-corona, should be structurally sound, and should be sufficiently hard to undergo mechanical cleaning. There is interest in developing ceramic materials for this application.

Historically, the invention of the transistor initiated the development of high purity single crystal semiconducting materials such as germanium and silicon. Today these materials are prepared with unparalleled perfection. In contrast, the development of electronic polycrystalline ceramics has been much more placid. The majority of polycrystalline electronic ceramics are produced using less defined synthesis and manufacturing processes. The resulting devices are often multicomponent and multiphase and contain significant microscopic and macroscopic defects. Undesirable impurity levels are orders of magnitude greater than in typical single crystalline semiconductors. In order to achieve polycrystalline perfection, processing and impurities levels must be controlled to avoid unwanted second phases, mixed valence conduction effects, and the segregation of impurities and second phase formations at grain boundaries.

The electrical conductivity of ceramic materials can encompass a wide range of values ranging from insulators to semiconductors to those of metallic conductors. Electrical conductivity in metals occurs by the movement of free electrons and is the result of bonding in the bulk crystal structure. In non-metallic materials such as ceramics, electrical conductivity can involve both electronic (migration of free electrons and holes) and ionic (migration of charged atoms) charge carriers and is the result of atomic imperfections (point defects) in the crystal structure or electronic imperfections (departure from stoichiometry). Atomic point defects are variations from the perfect periodicity of the crystal lattice. Four types of point defects are considered important in influencing conductivity: (1) vacancies (i.e., atomic sites in the crystal lattice which are not occupied that in the ideal crystal should be occupied); (2) interstitial atoms (i.e., atoms which occupy sites that in the ideal crystal should not be occupied); (3) misplaced atoms (i.e., atoms which occupy sites that in the ideal crystal are assigned to atoms of a different type; for example, in an AB crystal, a few A atoms may occupy B sites and vice versa); and (4) impurity atoms (i.e., impurity atoms which occupy normal host atom sites or interstitial host sties). Other defects that commonly occur in materials are dislocations, grain boundaries, and surface defects that interact with point defects to affect electrical conductivity. There can be considerable structural and compositional variations between the bulk crystal and regions close to dislocations, grain boundaries, and surfaces. These microscopic parameters often dominate electrical properties.

In polycrystalline materials (which by definition are comprised of individual crystallites separated by grain boundaries) defects, impurities and second phases are known to segregate to grain boundaries and strongly influence electrical properties (see, e.g., W. D. Kingery, *J. Am. Ceram. Soc.*, 57 (1974) 1–8). It has been clearly established that grain boundaries either act as paths of high mobility to enhance electrical conductivity or inhibit transport with respect to the bulk and reduce conductivity (see, W. D. Kingery, Advances in Ceramics, Volume 1, (L. M. Levinson, Ed.) American Ceramic Society, Columbus, Ohio, (1981) 1–22). Since the tendency is for solutes to segregate to grain boundary regions, the atomic feature that most often has the greatest impact on electrical behavior in polycrystalline materials is the grain boundary region.

It is generally accepted that to enhance conductivity in polycrystalline materials, the level of impurity ions must be controlled and the formation of bulk and grain boundary second phases should be avoided. Silica is a particularly influential impurity since it is generally present as an impurity and has limited bulk solubility in ionic metal oxide ceramics. Silica segregates at grain boundaries forming amorphous films that often adversely affect electrical properties. Intrinsic grain boundary effects can, however, be used advantageously to create engineered electrical properties in polycrystalline systems that cannot be obtained in single crystal systems. Varistors, thermistors, and barrier layer capacitors are good examples of devices that exploit grain boundary effects to obtain their unique electrical properties.

Alumina has many desirable intrinsic physical properties including mechanical strength, temperature resistance, chemical inertness, and electrical resistance that are primarily determined by its crystal structure. The electrical resistivity of alumina-based ceramics is typically greater than about $10^{15}$ $\Omega$cm at room temperature, which makes it suitable for use as insulators and electronic substrates. Indeed, chromia-alumina polycrystalline samples without magnesium cation additions are considered electrically insulating (i.e., their volume resistivity, $\rho$, is generally greater than about $10^{15}$ $\Omega$cm) and magnesia-alumina polycrystalline samples without chromium cation additions are also considered electrically insulating (i.e., their $\rho$ is generally greater than about $10^{15}$ $\Omega$cm). This is generally true at temperatures ranging from about 25° C. to 600° C.

Although alumina has desirable physical properties and is easily fabricated into functional shapes by standard ceramic forming and firing methods, its high electrical resistivity makes it unsuitable for applications requiring electrical conduction. Numerous ceramics are electrically conductive. However, most conductive ceramics have undesirable physical characteristics such as poor mechanical or thermal properties and are difficult to fabricate into useful shapes. A ceramic composition taking advantage of alumina's superior physical parameters, while being electrically conductive as well, would represent a particularly desirable ceramic.

With regard to electronic conductivity in oxides, there are generally two ways to enhance conductivity in the bulk crystal: by the departure from stoichiometry, or by the introduction of impurity atoms into a host lattice (controlled valence conduction). For alumina, conduction by departure from stoichiometry is unlikely because of alumina's high enthalpy of formation (1674.4 kJ/mol). Conduction from substitutional impurities is possible, however, though this has been shown to be limited at room temperature for alumina (see, F. A. Kroger, Advances in Ceramics, Volume 10, (W. D. Kingery, Ed.) American Ceramic Society, Columbus, Ohio, (1984) 1–15). Thus, any room temperature enhancement of electronic conductivity in alumina-based ceramics must come from grain boundary effects.

The majority of commercially available aluminas are sintered via a liquid phase route through the use of additives such as oxides of silicon, calcium, sodium, and potassium, often added in the form of minerals or clays. These additives enhance formation of siliceous liquid phases, and the presence of these viscous liquid phases during sintering aid densification at relatively low firing temperatures. They also form glassy (siliceous) grain boundary films on cooling. Even when liquid-forming additives are not used, sufficient impurities are generally present in the starting alumina powder to result in trace liquid formation upon sintering. Typical impurities include $SiO_2$, $CaO$, $Fe_2O_3$, $TiO_2$, $K_2O$, and $MgO$. Siliceous grain boundary films can deleteriously affect properties such as thermal and electrical conductivity by scattering conducting photons or electrons. For electronic conducting materials it is desirable to eliminate glassy grain boundary films to minimize scattering effects. Thus, of primary importance in developing an electrically conductive alumina is the elimination of any siliceous grain boundary films and unintended second phases and unintended impurity ions that may segregate to grain boundaries.

SUMMARY OF INVENTION

This invention provides an apparatus for electrostatically charging a continuous fibrous material being forwarded in a path from a source to a collecting means including a charged ion gun and an opposed grounded target electrode positioned on opposite sides of said path between said source and said collecting means, characterized by said target electrode having a ceramic surface facing said ion gun, said ceramic being a stable electronic conductor having a volume resistivity of from about $1 \times 10^7$ to $5 \times 10^{10}$ ohm-cm measured at the operating temperature, and a Vickers hardness of at least about 5 GPa.

The present invention further provides a ceramic composition of matter consisting essentially of oxides of $Mg^{2+}$, $Cr^{3+}$ and $Al^{3+}$, wherein the atomic ratio of $Cr^{3+}$ to $Al^{3+}$ is within the range of from about 1000 to about 100,000 ppm (i.e., there are from about 1000 to 100,000 $Cr^{3+}$ atoms per million $Al^{3+}$ atoms), and the atomic ratio of $Mg^{2+}$ to $Al^{3+}$ is within the range of from about 25 ppm to about 10,000 ppm (i.e., there are from about 25 to 10,000 $Mg^{2+}$ atoms per million $Al^{3+}$ atoms). Ceramic bodies (which may be formed by sintering such ceramic compositions wherein the $Mg^{2+}$ content is about 3 times the solubility limit of magnesia in alumina of the sintering temperature, or less at a sintering temperature of about 1950° C., or less) are also provided. In accordance with this invention, the ceramic body may be formed by sintering in an oxidizing atmosphere to inhibit electrical resistivity. This invention provides a sintered alumina-based ceramic composition of matter consisting essentially of oxides of $Mg^{2+}$, $Cr^{3+}$ and $Al^{3+}$, wherein $Cr^{3+}$ and $Mg^{2+}$ are present in amounts sufficient to provide a resistivity of about $10^{12}$ ohm-cm or less at 20° C. This invention further provides an electrically conductive polycrystalline, solid solution alumina ceramic prepared by a process comprising the steps of preparing a liquid containing a mixture of $Mg^{2+}$ and $Cr^{3+}$ cations by adding a $Mg^{2+}$-containing precursor and a $Cr^{3+}$-containing precursor to a solvent; mixing with the liquid a high purity alumina powder to obtain a well-dispersed slurry; evaporating the liquid from the slurry to form a dried powder containing the magnesium and chromium cations and alumina; preparing a green powder compact from the dried powder; and heating the green powder compact in an oxidizing atmosphere to densify. In this ceramic preparation the $Cr^{3+}$ is mixed with said alumina in an amount sufficient to provide an atomic ratio of $Cr^{3+}$ to $Al^{3+}$ within the range of from about 1000 ppm to about 100,000 ppm, and the $Mg^{2+}$ is mixed with said alumina in an amount sufficient to provide an atomic ratio of $Mg^{2+}$ to $Al^{3+}$ within the range of from about 25 ppm to about 3 times the solubility limit of magnesia in alumina at the sintering temperature.

DETAILED DESCRIPTION OF THE PREFERRED EMBODIMENTS

This invention provides a ceramic composition of magnesia, chromia and alumina, that when sintered forms a polycrystalline, solid solution alumina-based body that is electrically conductive at room temperature, has excellent electrical stability, and excellent mechanical properties. More specifically, by controlling the chromium, magnesium and impurity levels and by avoiding undesirable segregation and second phase formations at grain boundaries, superior room temperature semiconducting properties are achieved in an alumina-based polycrystalline ceramic.

A feature of the electrically conductive compositions of this invention is their excellent stability against voltage breakdown at high d.c. voltages, (e.g., 10 kV). Electrical instability generally is demonstrated by an increase or drift in resistivity with time, which eventually leads to voltage breakdown. Compositions may be prepared in accordance with this invention with essentially no resistivity drift. Electrical stability is especially important in high voltage d.c. applications and is generally not obtainable in electronic ceramics to the degree observed in the materials of this invention.

Ceramic bodies can be prepared in accordance with this invention with resistivities of about $10^{12}$ $\Omega$-cm or less at approximately 20° C. under a.c. conditions. Ceramic bodies can also be prepared in accordance with this invention with resistivities of about $10^{12}$ $\Omega$-cm or less at approximately 20° C. under d.c. conditions. By resistivity is meant the electrical resistance per cm of an article of 1 $cm^2$ cross-sectional area, having units of ohm-cm. Resistivity is the inverse of conductivity, and may also be referred to as bulk or volume resistivity. It can be determined, per Ohm's law, by the following equation: $\rho=(V)(A)/(I)(t)$ where V is the voltage (in volts), A is the sample cross-sectional area (in $cm^2$), I is the current (in amperes), and t is the sample thickness (in cm).

By "essentially no resistivity drift" is meant that the resistivity of a material will not vary over time from an initial resistivity by more than about 10%, under constant d.c. voltage of at least 10 kilovolts and constant temperature up to at least 350° C.

Figure 3:
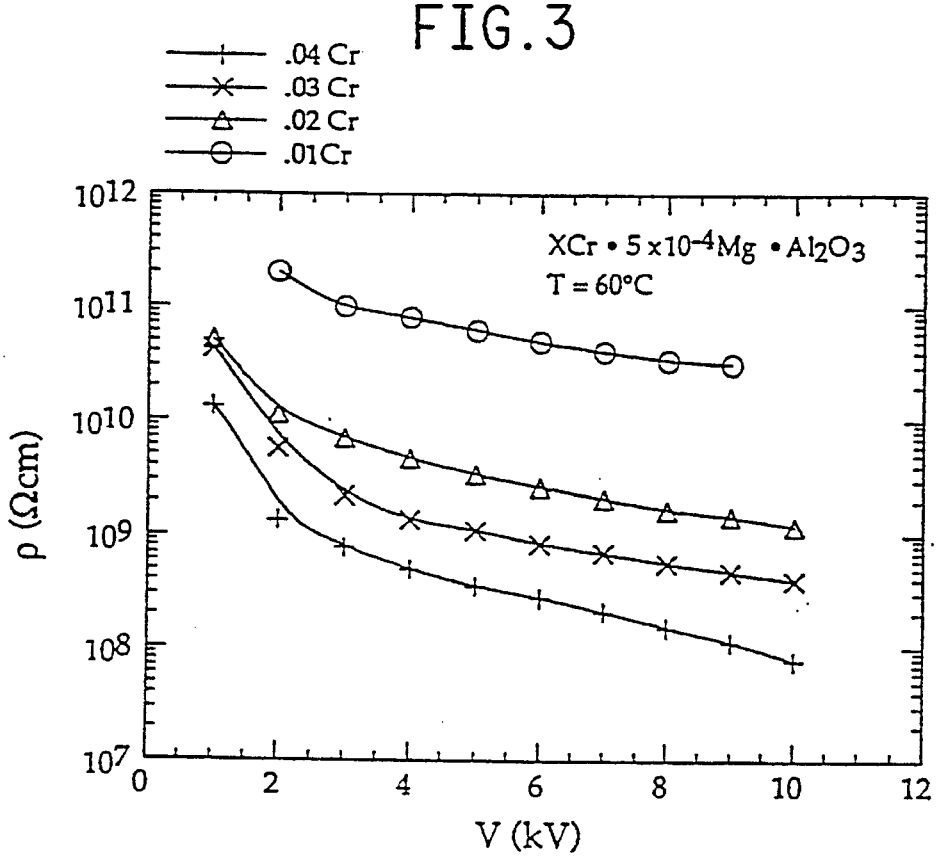
FIG. 3 graphs resistivity versus voltage for various chromium cation additions at constant temperature (60° C.) and magnesium cation content (500 ppm).
Figure 4:
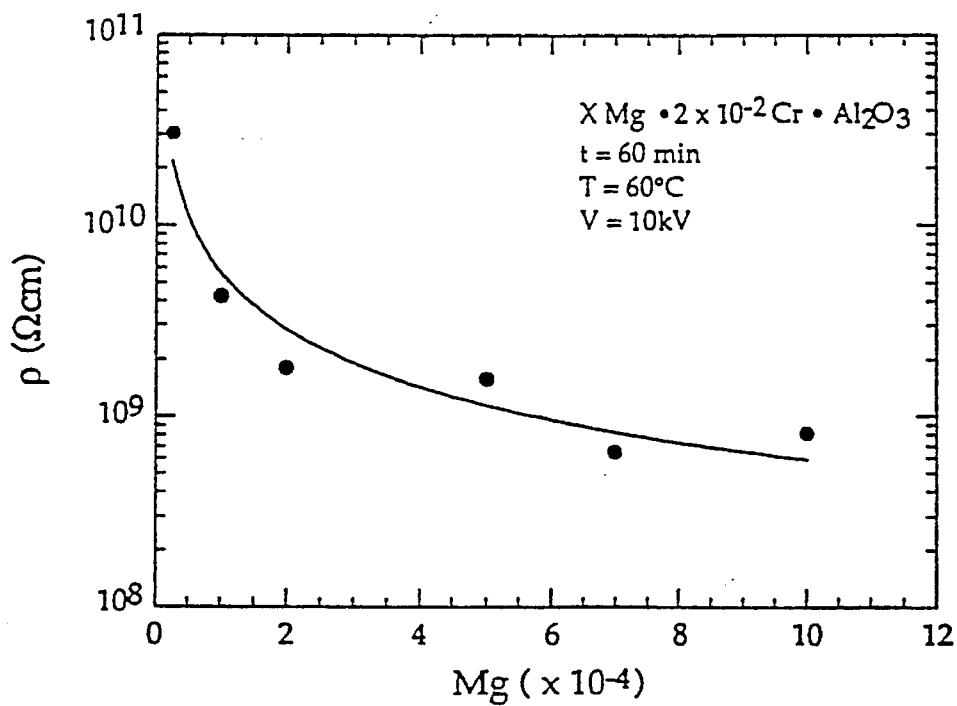
FIG. 4 graphs resistivity versus magnesium cation additions at constant voltage (10 kV), temperature (60° C.), chromium cation content (20000 ppm) for a time of 60 minutes.
Figure 6:
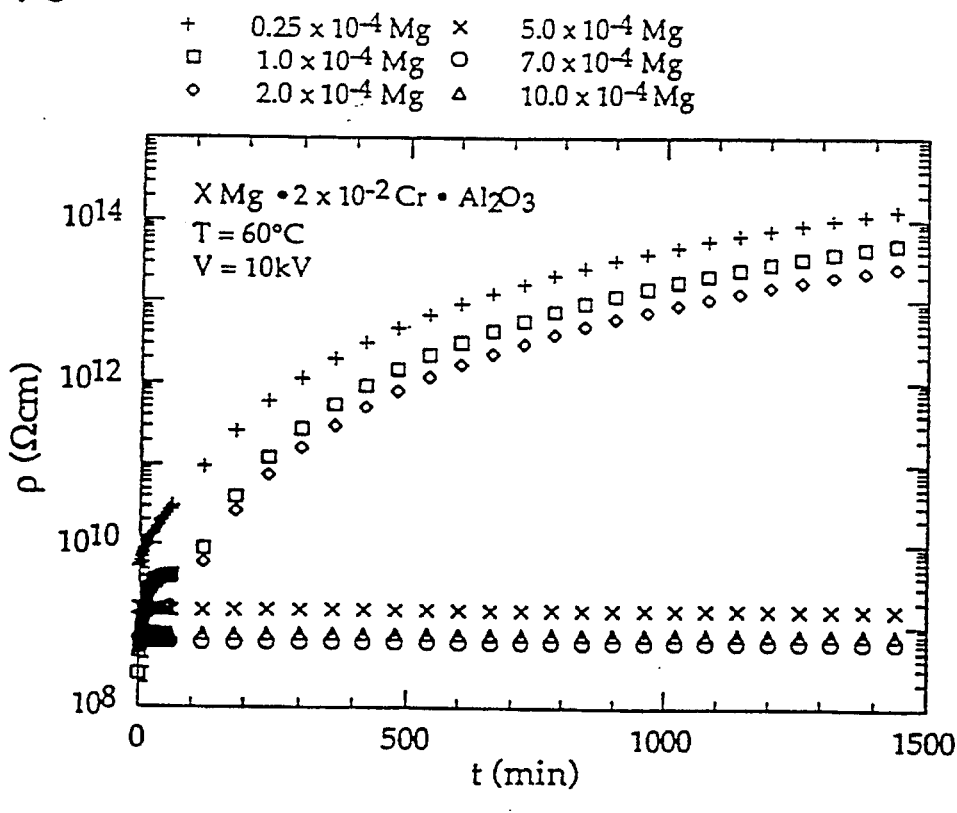
FIG. 6 graphs volume resistivity versus time for various magnesium cation additions at constant voltage (10 kV), temperature (60° C.), and chromium cation content (20000 ppm).

In the compositions of this invention, magnesia (MgO) and chromia ($Cr_2O_3$) are added as substitutional additives in solid solution with alumina, avoiding the formation of silaceous grain boundary phases and second phase spinel ($MgAl_2O_4$) to produce a ceramic body which is electronically conductive. FIG. 3 shows that resistivity decreased as the chromia content was increased. FIG. 4 shows that resistivity decreased as the magnesia content was increased up to the solubility limit of magnesia in alumina; increasing the magnesia content beyond the solubility limit did not appreciably affect resistivity. FIG. 6 shows that concentrations near the solubility limit exhibit essentially no resistivity drift.

Chromia ($Cr_2O_3$) is soluble with alumina across the chromia-alumina binary mixture and can thus be added without the formation of additional phases. Magnesia (MgO) has limited solubility in alumina and is preferably added below its solubility limit to avoid the formation of spinel and achieve a single-phase product. In addition to providing electrical conductivity in the compositions of the invention, magnesia in alumina acts as a solid-solution sintering aid which promotes densification, controls (retards) grain growth and has been suggested to redistribute silica impurities (see, S. J. Bennison et al., Ceramic Transactions, 7 (1990) 13–49). To minimize the formation of spinel, the solubility limit of magnesia in alumina preferably should not be exceeded.

The solubility limit of magnesia in alumina increases with increasing sintering temperature (see, R. L. Coble et al., J. Am. Ceram. Soc., 5 [1] (1968) 1–6), increasing impurity level and is also affected by the sintering atmosphere. A reducing sintering atmosphere increases the solubility limit and an oxidizing atmosphere, required to enhance conductivity in accordance with this invention, decreases the solubility limit. When the solubility limit of magnesia is exceeded, a spinel phase forms during sintering. In the process of the invention herein, it is not essential to be below the solubility limit of MgO in $Al_2O_3$. Electrical conductivity in the sintered body can be obtained at Mg additions above the solubility limit. For the present invention, magnesia additions above the solubility limit can be tolerated without degrading the electrical conductivity (preferably they do not exceed three times the solubility limit). Magnesia contents at levels above the solubility limit will not appreciably increase electrical conductivity or adversely affect electrical stability (i.e., the ceramic will exhibit essentially no resistivity drift at d.c. voltages of about 10 kV). To optimize conductivity, however, it is desirable not to exceed the solubility limit since Mg addition above the solubility limit does not appreciably contribute to, and may degrade, electrical conduction. Note that in the following discussion all magnesium cation ($Mg^{2+}$) and chromium cation ($Cr^{3+}$) additions are given as atomic mole fractions, i.e., mole of cation additive per mole of aluminum ($Al^{3+}$) cation.

Normally, the sintering temperature will range from about 1550° C. to about 1950° C. Generally in this range, the solubility limit of magnesia in alumina will vary from approximately 60 ppm to 3,300 ppm $Mg^{2+}/Al^{3+}$ as approximated by Coble et al., supra, using the following equation for sintering in a vacuum: $1nX=[8.1-(30,706/T)]$, where X is the atomic mole fraction of $Mg^{2+}/Al^{3+}$ and T is absolute temperature. The sintering temperature required to create fully dense bodies is preferably above about 1550° C. and about 160 ppm $Mg^{2+}$.

In the process of fabricating functional articles for the invention, use of high purity starting alumina and clean processing are important to avoid the formation of silicate-based grain boundary films. The starting alumina powders are often a source of impurities. The higher the purity of the starting alumina, the less impurities present and therefore the higher the electrical conductivity. Generally the starting alumina should be at least 99,900% pure and this purity level must be maintained during processing. Sumitomo AKP-30, Sumitomo Chemical America, New York, N.Y., (99.995% pure) which has a 0.5 mm crystallite size and 50% of the agglomerates below 1 mm, was found to be a suitable starting alumina. The powder is derived from an alkoxide route and although the metal ion impurities are on the order of 10 ppm, the powder contains carbon residue of the order of 100 ppm. Ceralox HP $Al_2O_3$ was also found to be a suitable starting alumina.

Magnesia additions are necessary for creating electrical conduction. Magnesia suppresses the formation of liquid grain boundary phases during sintering (see, Bennison et al., supra) which can degrade electrical properties in polycrystals. Polycrystalline and single crystal (ruby) chromium/alumina samples without magnesia additions are electrically insulating. Also, the compositions must be fired in an oxidizing atmosphere to create electrical conductivity. Samples fired in inert or reducing atmospheres will be electrically insulating.

Additionally, in the process for preparing the magnesia/chromia/alumina precursor powder for fabricating functional articles of the invention, all processing should be carried out in clean conditions to avoid contamination of the precursor powder and green body with unwanted impurities. Ideally, glassware, metalware, and milling in ceramic mills should be avoided in the preparation to minimize metal and silica impurities. Ball milling in ceramic mills should be avoided since it can introduce unwanted silica impurities. The preparation process preferably employs Teflon or high density polyethylene (HDPE) containers, stirrers, and spatulas. If processing aids such as surfactants or binders are employed, they should be of the clean-burning variety leaving essentially no residue on heat treatment. Surfactants and binders that contain metal ions should be avoided since these ions are adsorbed strongly onto the starting powder and remain as unwanted impurities during firing.

A suitable magnesia/chromia/alumina precursor powder for fabricating functional articles can be prepared using a solution method where the chromium and magnesium cations are added as soluble metal salts to a liquid containing high purity alumina powder and other green processing aids. The cations can also be added as metal oxides into a liquid containing alumina powder. One preparation method can be accomplished using the following steps: (a) preparing a liquid containing a mixture (e.g., a solution and/or suspension) of the appropriate amount of magnesium and chromium cations by adding appropriate cation-containing precursors to a solvent; (b) mixing with the liquid of step (a) a high purity alumina powder (the alumina being preferably at least 99.900% pure, and more preferably at least 99.995% pure) to obtain a well-dispersed slurry; (c) evaporating the liquid from the slurry of step (b) to form a dried powder containing the magnesium and chromium cations, alumina, and any other processing aids; (d) preparing a green powder compact from the powder of step (c); and (e) heating the green powder compact of step (d) in an oxidizing atmosphere to densify.

In preparing the liquid compositions of steps (a) and (b), any solvent in which the magnesium and/or chromium precursor cation salts will dissolve or disperse can be used, such as methanol, ethanol, or water. The solvent should be high purity to minimize contamination. The magnesium and chromium precursor salts can be those of nitrates, acetates, stearates, and chlorides or any other form that will decompose upon sintering; or they can be oxides which effectively disperse upon sintering. The liquid can be evaporated by heating to form a dried powder cake or by spray drying.

In fabricating functional articles, the magnesia/chromia/ alumina precursor powder can be compacted to form a green body (compact) by any compacting process yielding green densities of a least about 40%, preferably on the order of 55% or greater, of theoretical. During green processing, clean burning binders should be employed in order to minimize sources of contamination. Appropriate compacting methods include slip casting, tape casting, double-ended die pressing, isostatic pressing and injection molding. The method will vary depending on the fabricated article. For a forming method such as slip casting, casting can be done directly from the precursor solution since the soluble cations are strongly adsorbed onto the alumina surface and will not be lost with the solvent into the casting mold. Slip casting can also be accomplished by redispersing dried precursor powder in an appropriate liquid.

When sintering the green compact, it is preferable to surround the compact with powder of the same composition and purity. This prevents contamination from the furnace and minimizes the loss of magnesia and chromia both which vaporize during heating. In order to maintain high electrical conductivity, the sintering atmosphere must be oxidizing. Low $O_2$ partial pressure (e.g., reducing or inert atmospheres) results in poor electrical conductivity. Preferably, the temperature is ramped at 100° C./hr to 1000° C. and held for two hours. This effectively calcines the compact, decomposing the starting magnesium and chromium salts and distributing the magnesium and chromium ions to the alumina, and removing carbon impurities though pyrolysis and oxidation.

The heat treatment is continued by ramping at 500° C./hr to the sintering temperature, for example 1650° C., with a one hour soak. The furnace is then cooled to ambient. The resulting sintered article of the above preparation method has high density (approximately 99%), is polycrystalline with a grain size of about 5 to 10 mm, and is electrically conductive at room temperature.

Articles of this invention are useful as structural ceramic materials in various applications. They exhibit superior mechanical properties such as high strength, toughness and wear, and are especially useful in applications requiring mechanical integrity. They have the added advantage of being about five times lighter than steel per unit volume. Oxygen-sintered articles of this invention further are particularly useful in electronic applications requiring selective electrical conductivity at or near room temperature, such as electrostatic charging applications. This invention provides a d.c. stable electronic conductor (i.e., an electronic conductor which has essentially no resistivity drift). For example, an embodiment of this invention is useful for a discharge electrode in a process to produce flash-spun fibrous non-woven structures as described in U.S. Pat. No. 3,227,784 and U.S. Pat. No. 3,387,326, which are hereby incorporated by reference herein.

U.S. Pat. No. 3,387,326 discloses an apparatus for spreading and then charging a fibrous web in a corona charging field, and subsequently depositing the web uniformly in overlapping layers on a moving surface to form a nonwoven sheet. The corona charging field is generated by and consists of an active charge generating electrode (e.g., an ion gun) and a passive charge collecting electrode (e.g., a target plate). The web is prepared by flash extrusion of a solution of crystallizable polymer. In this "flash extrusion" process, the strand is formed by extruding a homogeneous solution of a fiber-forming polymer dissolved in a liquid which is a solvent for the polymer above its normal boiling point. The solution, at a temperature above the normal boiling point of the solvent is extruded into a medium of lower temperature and substantially lower pressure. The liquid within the extrudate then vaporizes and cools the extrudate, causing solidification of the polymer. The resulting fibrous web may be spread out by causing it to impinge on a baffle or curved surface as it exits from the extrusion orifice. It may then be deposited upon a moving belt in overlapping, multidirectional layers to form a nonwoven fibrous sheet.

A corona charging device is located along the path of advance just downstream from the mechanical spreading device. It serves to place a charge on the fibers in the web and to thereby sustain them in a separated or open condition. The charging device includes an electrode, such as an ion gun, and a second electrode, a target discharge plate. The target plate is a flat plate construction assembled in the equipment with the flat surface facing the ion gun and the path of advance. The trailing edge of the target plate terminates in a slightly rounded edge.

In optimizing a process to produce nonwovens, various modifications to the target discharge plate can be contemplated (see, e.g., U.S. Pat. No. 3,587,739, incorporated by reference herein, which discloses covering the target plate with an elastomer in a certain resistance range; and U.S. Pat. No. 3,860,369, hereby incorporated by reference herein, which discloses incorporating the target plate and ion gun into an aerodynamic shield formed by two plates).

Target plates comprising the ceramic composition of this invention are useful in such processes to produce fibrous webs because the ceramic exhibits desirable conductivity and mechanical properties. Accordingly, target plates of ceramics which are stable electronic conductors are provided herein.

The use of a ceramic material having suitable resistivity for the passive charge collecting electrode in accordance with this invention improves the operability, stability and the longevity of the charging plate. A typical plate thickness is about ⅜ inch (0.95 cm). Preferably, the ceramic used for such plates has a volume resistivity of from about $1 \times 10^9$ to about $5 \times 10^9$ ohm-cm measured at the operating temperature. For example, at 15 kV the ceramic used for a 0.95 cm thick plate suitably has a volume resistivity of about $1.6 \times 10^9$ ohm-cm. For thinner plates (e.g., down to about 0.18 cm) somewhat higher volume resistivity (e.g., $5 \times 10^9$ to $1 \times 10^{10}$ ohm-cm) are generally more desirable. Thicker plates would use lower resistivities. It is also desirable that the ceramic have a Vickers hardness of at least about 5 GPa (preferably at least about 14 GPa) and a modulus of rupture (i.e., breaking strength) of at least about 400 MPa. Conductive ceramic compositions of oxides of $Mg^{+2}$, $Cr^{+3}$ and $Al^{+3}$ of this invention are considered suitable for this application.

The present invention can be further understood by reference to the following non-limiting examples.

EXAMPLES

The following examples show that electrical conductivity occurred by a grain boundary conductivity mechanism, and was electronic in nature; and that conductivity was affected by both $Mg^{2+}$ and $Cr^{3+}$ cation additions and by silica impurities. All temperatures are expressed in degrees Celsius and all cation additions and impurities are given as atomic mole fractions (i.e., mole of cation additive per mole of aluminum ($Al^{3+}$) cation).

EXAMPLE 1

A precursor powder with cation additions of 500 ppm $Mg^{2+}$ and 5000 ppm $Cr^{3+}$ was prepared in the following manner:

A. 126 mls of laboratory grade methanol were measured and placed in a high-density polyethylene beaker having a heated jacket.

B. 0.7451 g of 99.999% $Cr_2O_3$ (Johnson Matthey Electronics, Orchard Rd, Royston, England), were weighed and added to the methanol. The dispersion was treated to break-up agglomerates with an ultrasonic probe set at 40 W/cm$^2$ for 1 minute.

C. 0.3219 g of $Mg(NO_3)_2 \cdot 6H_2O$ were added to the chromia/methanol mixture and stirred until dissolved into solution.

D. 100 grams of Sumitomo AKP-30 alumina powder (Sumitomo Chemical America, New York, N.Y.) was weighed and added to the magnesia/chromia/methanol solution.

E. The dispersion was again treated to break-up agglomerates with an ultrasonic probe for 1 minute.

F. The mixture was heated to 40° C. and stirred with a HDPE stirrer until the slurry thickened through evaporation of the solvent.

G. The stirrer was removed and the remaining solvent evaporated off to yield the precursor power.

H. When dry, the precursor powder was crushed to break-up soft agglomerates and sieved through a 325 mesh screen.

I. The precursor powder was placed in a double ended die and formed into 1.25 inch (3.18 cm) diameter pellets using 3500 psi (24.1 MPa) of uniaxial pressure.

J. The resultant pellets were placed in a bed of unpressed precursor powder and placed in a covered high purity alumina crucible. The assembly was then placed into an electric furnace and sintered in air to 1650° C. as follows; 2° C./min. up to 1000° C. and held at 1000° C. for 2 hours; 8° C./min. to 1650° C. and held at 1650° C. for 1 hour; then cooled to ambient. The resultant sintered samples were approximately 1.0 inch (2.54 cm) in diameter and approximately 0.125 (0.32 cm) inches thick, dense and flat with no cracks, ruby in color, and were slightly translucent.

Electrical measurements were made on 1.0 inch (2.54 cm) diameter sintered sample disks by a two-probe d.c. method (Examples 1–16). Two probe d.c. measurements were used to calculate volume resistivities and the ac impedance measurements were used to characterize electrical conductivity mechanisms. The d.c. measurement data are expressed as volume (bulk) resistivity ($\Omega$cm).

For the two-probe d.c. technique, sample disks were not electroded since nonohmic contact behavior is not a concern when measuring resistivities of the magnitude of these compositions. A constant voltage was impressed across the samples using 0.25 inch (0.64 cm) diameter copper contacts placed on the top and bottom surfaces of the sample disks. The resultant current through the sample was then measured. Voltage and current measurements were made using a Hitotronics H800-PL unit. Voltage was varied from 1 kV to 10 kV to characterize voltage effects. Measurements were made in a constant temperature and humidity chamber at room temperature and 60° C., and 50% humidity.

EXAMPLES 2–16

Volume Resistivity Measurements

Examples 2 through 16 were prepared essentially as described in Example 1, however the amounts of the components were varied. The actual amounts used and the resistivity measurement (d.c. method) for each sample are shown in Table I. Additionally, Examples 6 through 16 were tested for electrical stability (resistivity drift) for a 24 hour time period.

Figure 1:
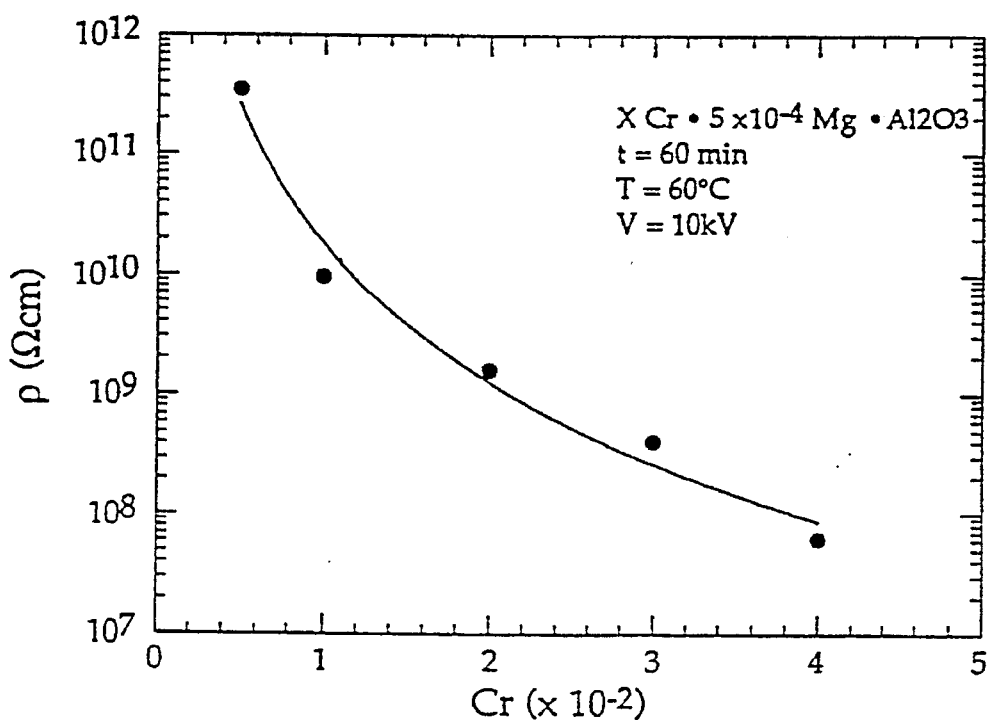
FIG. 1 graphs resistivity versus chromium cation additions, at constant voltage (10 kV), temperature (60° C.), magnesium cation content (500 ppm) for a time of 60 minutes.

FIG. 1 plots results from Examples 1–5 and shows the effect of chromium cation ($Cr^{3+}$) additions on volume resistivity at constant voltage (10 kV), temperature (60° C.), and magnesium cation ($Mg^{2+}$) content (500 ppm). This figure shows that resistivity decreased from insulating to less than $10^8$ $\Omega$cm as the amount of chromium cations were increased. The data was fitted to the solid line using the method of least squares. The following empirical equation was generated from the force fit data at 500 ppm $Mg^{2+}$: $\rho = a X^m$, where $\rho$ is the volume resistivity, X is the mole fraction of $Cr^{3+}$ cations, a is a constant which equals $1.82 \times 10^{10}$, and m is an exponent which equals $-3.86$. Substituting a and m into this equation gives $\rho = 1.82 \times 10^{10} X^{-3.86}$. This equation can be used to determine the effect of chromium cation additions on resistivity and is useful for functional design.

Figure 2:
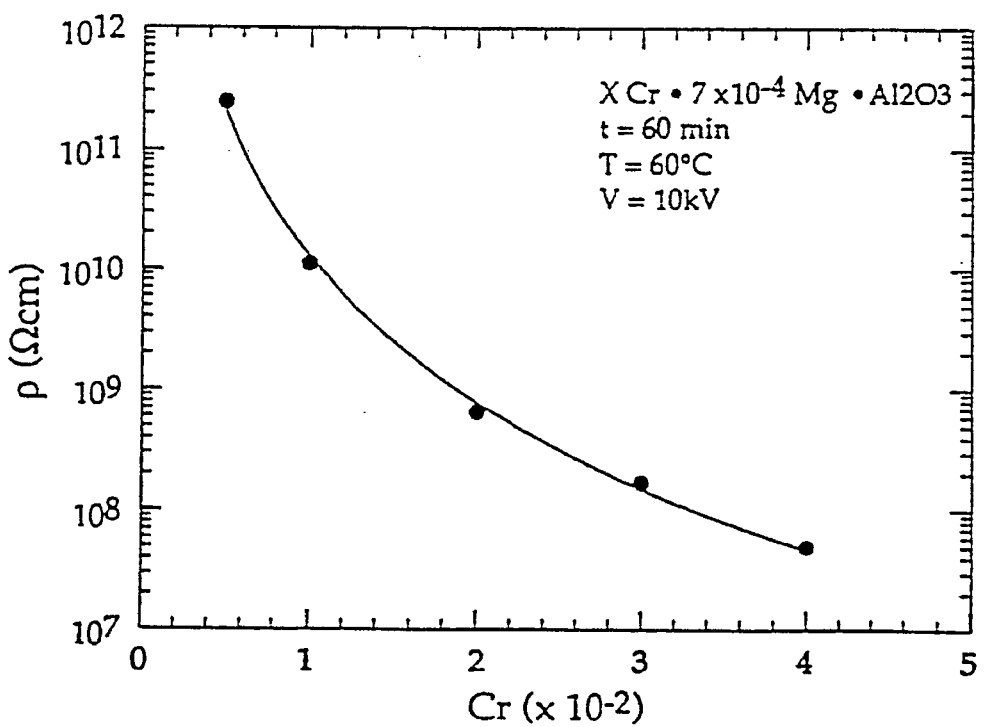
FIG. 2 graphs resistivity versus chromium cation additions at constant voltage (10 kV), temperature (60° C.), magnesium cation content (700 ppm) for a time of 60 minutes.

FIG. 2 depicts Examples 2–10 and shows the effect of chromium cation additions on volume resistivity at constant voltage (10 kV), temperature (60° C.), and magnesium cation content (700 ppm). This figure shows that resistivity decreases as the amount of chromium cations were increased. Comparing FIGS. 1 and 2, it is evident that samples with 500 ppm magnesium cation were more resistive than similar samples with 700 ppm magnesium cations. (FIG. 4 shows the effect of magnesium cation additions on resistivity.) The following empirical relation was generated from the fitted data at 700 ppm $Mg^{2+}$: $\rho=1.29\times10^{10} X^{-4.05}$.

FIG. 3 depicts Examples 2–5 and shows the effect of voltage on volume resistivity for various chromium cation additions at constant temperature (60° C.), and magnesium cation content (500 ppm). This figure shows that resistivity increased as the d.c. voltage was decreased. The figure also shows that resistivity decreased as the amount of chromium cations were increased, as discussed above.

FIG. 4 depicts Examples 11–16 and shows the effect of magnesium cation additions on volume resistivity at constant voltage (10 kV), temperature (60° C.), and chromium cation content (20000 ppm). This figure shows that resistivity decreased from insulating to less than $10^9$ as the amount of magnesium cations were increased. The following empirical relation was generated from the fitted data: $\rho=5.61\times10^9 X^{-0.98}$. Note that at magnesium additions greater than about 700 ppm there was no further decrease in resistivity. The solubility limit of magnesia in alumina is approximately 500 ppm. Magnesia addition above the solubility limit does not appreciably contribute to conductivity, and may degrade conductivity.

Figure 5:
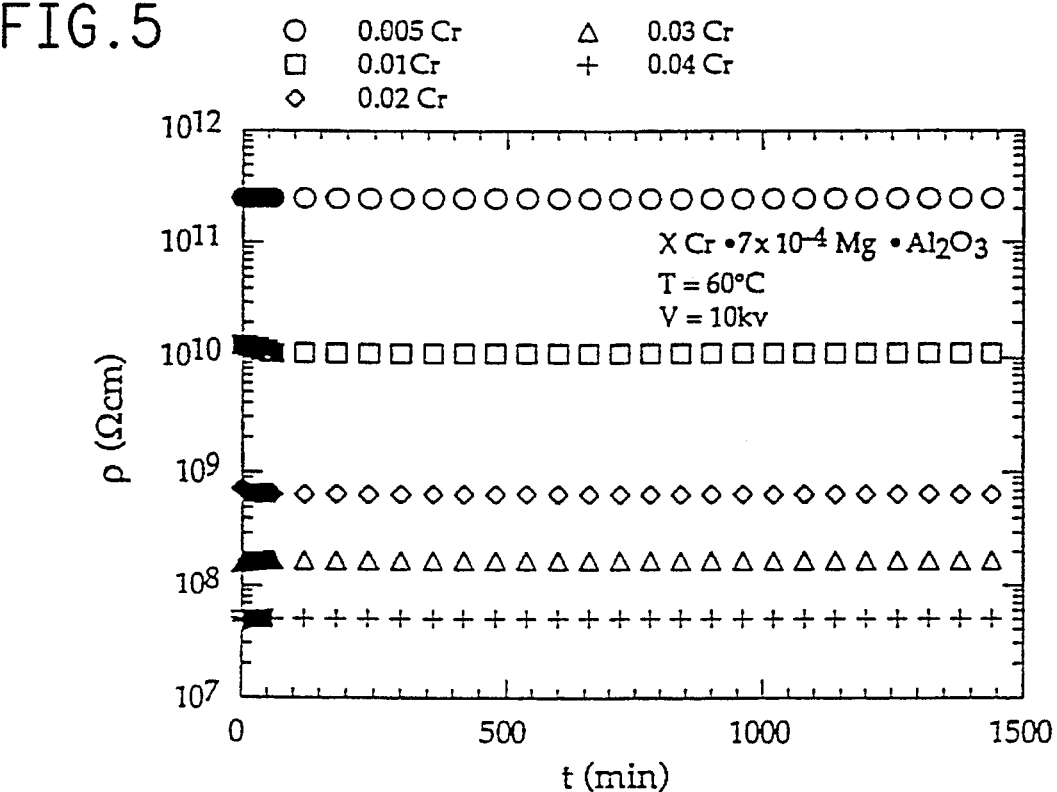
FIG. 5 graphs resistivity versus time for various chromium cation additions at constant voltage (10 kV), temperature (60° C.), magnesium cation content (700 ppm).

Electrical stability testing at high d.c. voltage (10 kV) for Examples 6–10 are shown in FIG. 5 which plots resistivity versus time for various chromium cation additions at constant temperature (60° C.) and constant magnesium cation content (700 ppm). This figure shows that resistivity did not drift or increase towards voltage breakdown with time. These samples were electrically stable at 10 kV under d.c. conditions for 24 hours, which was the test duration. FIG. 6 shows a similar graph for various magnesium cation additions at constant temperature (60° C.) and constant chromium cation content (20000 ppm), which are Examples 12–16. This figure shows that samples with low magnesium cation additions (less than about 100 ppm) were not as electrically stable with time (resistivity increased with time) as the samples with higher (greater than about 100 ppm) magnesium cation additions. Electrical instability is shown as an increase in resistivity with time which eventually leads to voltage breakdown. Electrical stability is especially important in high voltage d.c. applications and is generally not obtainable in electronic ceramics to the degree observed in the subject materials.

EXAMPLE 17

Target Discharge Plate

A ceramic was prepared substantially similar to the manner of Example 1, except the ceramic was formed into a functional electrostatic discharge plate. The precursor powder was placed in a mold and uniaxially dry pressed at 3500 psi to form an unfired circular plate which was 0.5 inches thick and 12.0 inches in diameter. This plate was then sintered in air at 1650° C. The resulting plate had an outer diameter dimension of 9.84 inches due to shrinkage of approximately 18%.

EXAMPLE 18

Fiber Charging

A target discharge plate prepared substantially in accordance with the procedure of Example 17 was machined, forming an annulus having a 4.1 inch (10.4 cm) inside diameter and a 9.0 inch (22.9 cm) outside diameter to conform to the desired dimensions of a target plate for flash spinning. The target plate surface was polished to about a 9-microinch surface roughness with a resulting thickness of 0.375 inches (0.95 cm). A 45 degree chamfer, about 1/16 inch (0.16 cm) wide with rounded edges, was machined on the outside edge. A metallic paint on the back of the plate was used for attachment to ground. The volume resistivity of this finished target plate was about $5\times10^9$ ohm-cm. The Vickers hardness of the discharge plate ceramic is estimated as above 14 GPa.

The ceramic target plate was compared to a metal target plate in a two-position test spin where a 20 weight percent solution of high density polyethylene in hydrocarbon solvent was flash spun at about 55 pounds per hour (25 Kg/h) substantially in accordance with the general procedures outlined in U.S. Pat. No. 3,227,784, U.S. Pat. No. 3,387,326, U.S. Pat. No. 3,578,739 and U.S. Pat. No. 3,860,369. The flash-spun webs were (1) passed through the charging zones formed by an ion gun and ceramic plate in one position and an ion gun and metal plate in a second position, (2) then passed through identical diffusers, and (3) laid and pinned to a belt moving at 50 yards a minute (45.7 m/min.). Typically, during the spin, the ion gun potential and current were maintained at about 10 kV (direct current) and about 350 microamps. The web current was about 40 microamps on the position with the ceramic plate and about 45 microamps on the position with the metal plate, giving charging efficiencies of about 11 and 13 percent, respectively, with a resulting web charge of about 6 microcoulombs/gm in both cases. Both webs were judged to pin both equivalently and satisfactorily to the belt. However, the ceramic target plate resistance, at about $5\times10^9$ ohm-cm, was judged to be somewhat higher than optimum as there was some leakage current around the outer surface to ground. Discharge plates of somewhat lower resistance can readily be prepared in accordance with this invention.

EXAMPLE 19

AC Impedance Measurements—Electrical Conductivity Mechanisms

Five samples were selected for a.c. impedance characterization to show the effects of magnesium and chromium cation additions and silica impurities on electrical properties. These examples show that electrical conductivity occurred by a grain boundary conductivity mechanism and was electronic in nature, and that conductivity was affected by both $Mg^{+2}$ and $Cr^{+3}$ cation additions and by silica impurities.

Quantitative elemental analyses as determined by SSMS (spark source mass spectrometry, Northern Analytical Laboratories, Merrimack, N.H.) for the five samples are listed in Table III. The samples included Example 4 (prepared as above) and four Comparative Examples (A, B, C, and D). The five samples, characterized according to their major elemental components were as follows: Example 4—30,000 ppm $Cr^{3+}$/500 ppm $Mg^{2+}$/alumina with no added silica impurities; Comparative Example A—30,000 ppm $Cr^{3+}$/500 ppm $Mg^{2+}$/alumina with 1000 ppm silica; Comparative Example B—20,000 ppm $Cr^{3+}$/500 ppm $Mg^{2+}$/alumina with 1000 ppm silica; Comparative Example C—500 ppm $Mg^{2+}$/alumina with no chromium or added silica; Comparative Example D—single crystal ruby (500 ppm $Cr^{3+}$).

Examples 4 and A–D were prepared by the solution method, as described in Example 1, to minimize impurities. In addition to the solution preparation, Examples A and B were ball milled in alumina mills for eight hours. Ball milling effectively introduced silica and other impurities, as indicated by the elemental analysis (Table III), and should be avoided. Silica impurities were expected to degrade electrical conductivity. Example D, single crystal ruby, was electronic grade (Union Carbide, Crystal Products Division, Washougol, Wash.) with minimal impurities.

Figure 7:
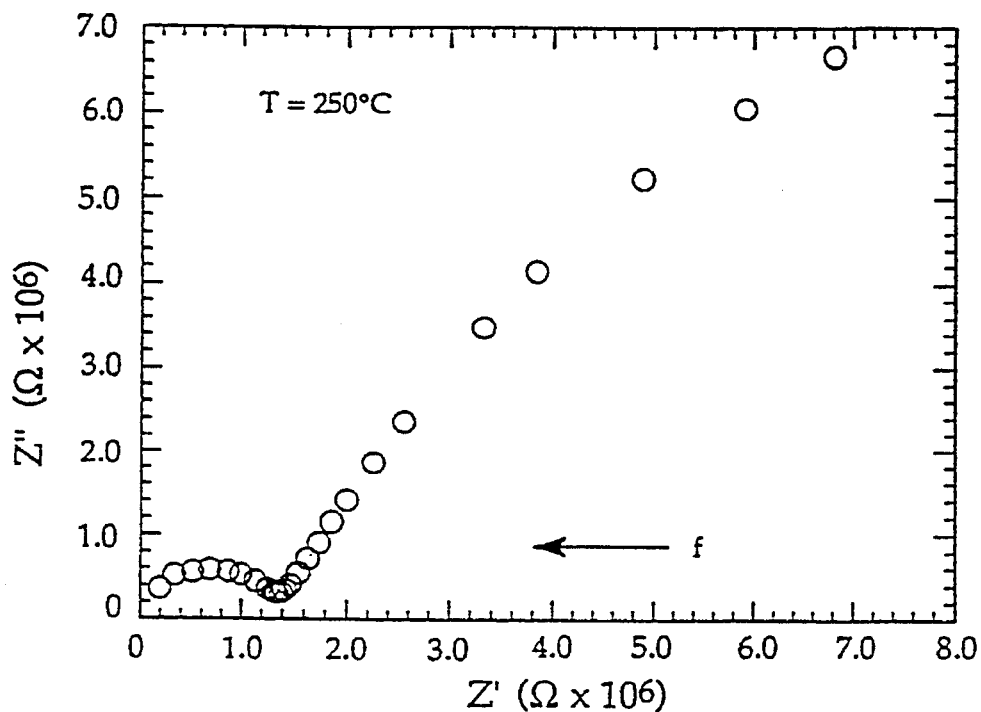
FIG. 7 represents a complex impedance plot at 250° C. for a sample having 30000 ppm chromia, 500 ppm magnesia and no silica impurities.

AC impedance measurements were used to characterize electrical conductivity mechanisms. In the complex impedance approach, the overall electrical response of a material can be modeled in terms of equivalence circuits that distinguish individual processes contributing to conductivity within the material. Each conductivity component is assigned a parallel resistor-capacitor network that are connected in series as shown in FIG. 7, a complex impedance plot for Example 4. If the capacitance of each network is sufficiently different, a series of contacting semicircles can be obtained in a complex impedance plot allowing individual conductivity processes to be distinguished. Impedance plots are useful for characterizing bulk, grain boundary, and bulk/electrode interface responses. It is also effective for characterizing any changes in conductivity processes that can occur from variations in processing.

For the a.c. impedance measurements, sample disks were electroded with evaporated gold metal on the top and bottom surface's to ensure ohmic contacts. Two terminal measurements of the capacitance and loss tangent were made in the frequency range from 13 Hz to 100 Hz using a Genrad GR1689 bridge. Measurements at room temperature were obtained using a Hewlett-Packard 16043E test fixture. Measurements taken at high temperature were done in a quartz tube furnace using a test fixture made of high-purity alumina and sapphire. Prior to all measurements, short and open calibrations were done for the instruments and the holders at each measurement temperature and compensations were included in the resultant calculations. AC impedance measurement data are expressed as bulk conductivity $((\Omega cm)^{-1})$.

FIG. 7 shows a complex impedance plot at 250° C. for Example 4, alumina with 30,000 ppm $Cr^{3+}$ and 500 ppm $Mg^{2+}$, with no silica. The figure shows two well formed connecting semicircles corresponding to components of high and low frequency conduction. Both semicircles correspond to regions of grain boundary electrical conductivity. Bulk conductivity in alumina based materials is highly unlikely at these temperatures.

Figure 8:
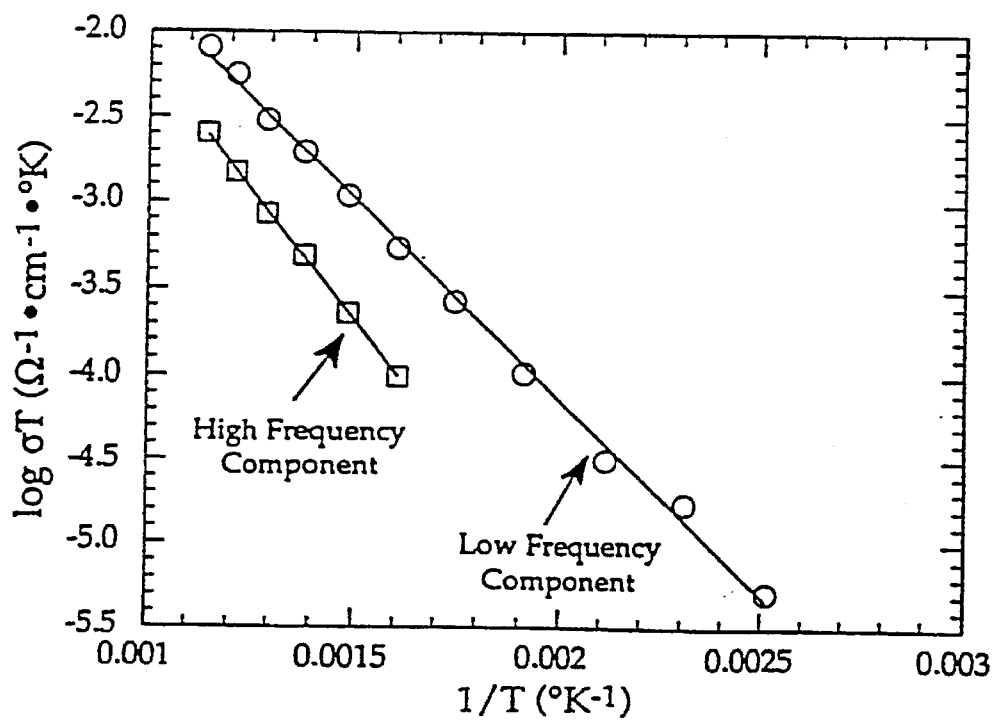
FIG. 8 represents an Arrhenius plot for low and high frequency components to grain boundary electrical conductivity for an alumina-based sample having 30000 ppm chromia, 500 ppm magnesia, and no silica.

FIG. 8 shows an arrhenius plot in the temperature range of ambient to 600° C. for the low and high frequency components of conductivity for Example 4. The log $\sigma T$—$1/T$ plots are linear. Using a method of least squares fit and the Arrehnius relation, $\sigma T = \sigma_o e^{(-E/KT)}$, where $\sigma$ is conductivity, $\sigma_o$ is the pre-exponential, E is the activation energy, K is the Boltzman constant, and T is absolute temperature, activation energies of 0.46 eV (44.4 kJ/mol) and 0.60 eV (57.9 kJ/mol) were calculated for the respective low frequency ($Q_1$) and high frequency ($Q_2$) conductivity components. Activation energies in this range and temperature region are consistent with electronic conductivity. Ionic or fast ion conductivities are highly unlikely in alumina-based materials at these temperatures.

Similar complex impedance plots and activation energies can be generated for the Examples A–D listed in Table II. These results are summarized in Table II which shows electrical resistivities measured at 25° C., 125° C. and 350° C. and the respective low and high frequency activation energies. Example 4 without silica impurities was more conductive and had lower activation energies than Examples A and B with silica impurities. Clearly silica degrades electrical conductivity. Example C (no chromium) was substantially more insulating with a higher activation energy than samples containing both chromium and magnesium. Example D, single crystal ruby (no magnesium), was insulating. Clearly chromium and magnesium are required to create electrical conductivity. Grain boundary conductivity is further reinforced by the observation that the single crystal ruby was insulating suggesting that the lack of grain boundaries in the single crystal inhibits conductivity. Also note that in Example B (20000 ppm $Cr^{3+}$/500 ppm $Mg^{2+}$/alumina with silica) the high frequency component to conductivity was absent and thus only the low frequency activation energy was calculated. The absence of a high frequency conductivity component, as well as higher low frequency activation energies and higher resistivities, suggests that silica impurities were inhibiting conductivity by deleteriously altering conductive pathways along grain boundaries. Example C with no chromium also lacked a high frequency component which suggests a similar degradation in conductivity from lack of chromium additions.

In summary, the complex impedance analysis suggests that chromium and magnesium additions in alumina in optimized amounts enhanced electrical conductivity by creating effective pathways for conduction along grain boundaries. Silica, and other impurities, inhibited conductivity by degrading these conductive pathways.

TABLE I

| | | | | | | | | | |
|---|---|---|---|---|---|---|---|---|---|
| | | | | Volume Resistivity, ρ (60° C., 10 kV, 60 min.) | | | | | |
| EX | MeOH (g) | $Al_2O_3$ (g) | $Cr_2O_3$ (g) | $MgNO_3$ (g) | Cr (ppm) | Mg (ppm) | DRIFT* | r (ohm-cm) | SEE FIGS.: |
| 1 | 159.54 | 100.0 | 0.7451 | 0.3219 | 5000 | 500 | — | $3.5 \times 10^{11}$ | 1 |
| 2 | 159.54 | 100.0 | 1.4902 | 0.3219 | 10000 | 500 | — | $9.7 \times 10^{10}$ | 1,3 |
| 3 | 159.54 | 100.0 | 2.9804 | 0.3219 | 20000 | 500 | — | $1.6 \times 10^{9}$ | 1,3 |
| 4 | 159.54 | 100.0 | 4.4706 | 0.3219 | 30000 | 500 | — | $4.1 \times 10^{8}$ | 1,3,7,8 |
| 5 | 159.54 | 100.0 | 5.9608 | 0.3219 | 40000 | 500 | — | $6.2 \times 10^{7}$ | 1,3 |
| 6 | 159.54 | 100.0 | 0.7451 | 0.4506 | 5000 | 700 | None | $2.5 \times 10^{11}$ | 2,5 |
| 7 | 159.54 | 100.0 | 1.4902 | 0.4506 | 10000 | 700 | None | $1.1 \times 10^{10}$ | 2,5 |
| 8 | 159.54 | 100.0 | 2.9804 | 0.4506 | 20000 | 700 | None | $6.5 \times 10^{8}$ | 2,5 |
| 9 | 159.54 | 100.0 | 4.4706 | 0.4506 | 30000 | 700 | None | $1.7 \times 10^{8}$ | 2,5 |
| 10 | 159.54 | 100.0 | 5.9608 | 0.4506 | 40000 | 700 | None | $5 \times 10^{8}$ | 2,5 |
| 11 | 159.54 | 100.0 | 2.9804 | 0.0322 | 20000 | 50 | Yes | $3. \times 10^{10}$ | 4 |
| 12 | 159.54 | 100.0 | 2.9804 | 0.0644 | 20000 | 100 | Yes | $4.2 \times 10^{9}$ | 4,6 |

TABLE I-continued

| EX | MeOH (g) | Al$_2$O$_3$ (g) | Cr$_2$O$_3$ (g) | MgNO$_3$ (g) | Cr (ppm) | Mg (ppm) | Volume Resistivity, ρ (60° C., 10 kV, 60 min.) DRIFT* | r (ohm-cm) | SEE FIGS.: |
|----|----------|-----------------|-----------------|--------------|----------|----------|--------------------------------------------------------|------------|------------|
| 13 | 159.54 | 100.0 | 2.9804 | 0.1287 | 20000 | 200 | Yes | $1.8 \times 10^9$ | 4,6 |
| 14 | 159.54 | 100.0 | 2.9804 | 0.3219 | 20000 | 500 | None | $1.6 \times 10^9$ | 4,6 |
| 15 | 159.54 | 100.0 | 2.9804 | 0.4506 | 20000 | 700 | None | $6.5 \times 10^8$ | 4,6 |
| 16 | 159.54 | 100.0 | 2.9804 | 0.6437 | 20000 | 1000 | None | $8.1 \times 10^8$ | 4,6 |

*24 hour test

TABLE II

Summary of a.c. impedance measurements

| EX | Composition (ppm) | 25° C. (Ωcm) | 125° C. (Ωcm) | 350° C. (Ωcm) | Q$_1$ (eV) | Q$_2$ (eV) |
|----|-------------------|--------------|---------------|---------------|-----------|-----------|
| 4 | 30000Cr/500Mg/Al$_2$O$_3$ no added Si | $1.5 \times 10^9$ | $7.7 \times 10^7$ | $1.1 \times 10^6$ | 0.46 | 0.60 |
| A | 30000Cr/500Mg/Al$_2$O$_3$ 1000Si | $>10^{12}$ | $1.1 \times 10^{11}$ | $9.1 \times 10^7$ | 0.80 | 0.86 |
| B | 20000Cr/500Mg/Al$_2$O$_3$ 1000Si | $>10^{12}$ | $1.4 \times 10^{11}$ | $3.7 \times 10^8$ | 0.87 | — |
| C | 500Mg/Al$_2$O$_3$ no added Si | $>10^{12}$ | $>10^{12}$ | $7.1 \times 10^9$ | 1.40 | — |
| D | Ruby Single Crystal | $>10^{12}$ | $>10^{12}$ | $>10^{12}$ | — | — |

TABLE III

Quantitative elemental Analysis as determined by SSMS

|    | 4 | A | B | C | D |
|----|-----|------|------|------|------|
| Li | 0.25 | 5.0 | 5.0 | 0.25 | 0.1 |
| Na | 25.0 | 500.0 | 300.0 | 5.00 | 1.5 |
| Mg | 500.0 | 500.0 | 500.0 | 500.00 | 2.5 |
| Cr | Major | Major | Major | 0.4 | 225.0 |
| Si | 10.0 | 1000.0 | 1000.0 | 7.50 | 7.5 |
| K  | 1.0 | 75.0 | 75.0 | 1.00 | 0.5 |
| Ca | 2.5 | 75.0 | 50.0 | 2.00 | 1.0 |
| Ti | 0.05 | 15.0 | 5.0 | 0.05 | 0.05 |
| Fe | 2.5 | 15.0 | 10.0 | 1.50 | 0.5 |

What is claimed is:

1. An apparatus for electrostatically charging a continuous fibrous material being forwarded in a path from a source to a collecting means including a charged ion gun and an opposed grounded target electrode positioned on opposite sides of said path between said source and said collecting means, wherein:

said target electrode has a ceramic surface facing said ion gun, said ceramic surface being formed of a stable electronic conductor comprising a polycrystalline, solid solution alumina-based ceramic composition having a volume resistivity of from about $1 \times 10^7$ to $5 \times 10^{10}$ ohm-cm measured at the operating temperature and a Vickers hardness of at least about 5 GPa.

2. The apparatus of claim 1 wherein the ceramic composition has a Vickers hardness of at least about 14 GPa.

3. The apparatus of claim 1 wherein the ceramic composition consists essentially of oxides of $Mg^{2+}$, $Cr^{3+}$ and $Al^{3+}$, wherein the atomic ratio of $Cr^{3+}$ to $Al^{3+}$ is within the range of from about 1000 to about 100,000 ppm, and the atomic ratio of $Mg^{2+}$ to $Al^{3+}$ is within the range of from about 25 ppm to 10,000 ppm.

* * * * *